United States Patent
Sheehan et al.

(10) Patent No.: US 12,511,584 B2
(45) Date of Patent: *Dec. 30, 2025

(54) AUTOMATED SYSTEMS FOR MACHINE LEARNING MODEL DEVELOPMENT, ANALYSIS, AND REFINEMENT

(71) Applicant: ZestFinance, Inc., Burbank, CA (US)

(72) Inventors: David Sheehan, Santa Monica, CA (US); Siavash Yasani, Altadena, CA (US); Bingjia Wang, Glendale, CA (US); Yunyan Zhang, El Monte, CA (US); Qiumeng Yu, Los Alamos, NM (US); Ruochen Zha, Pasadena, CA (US); Adam Kleinman, Santa Monica, CA (US); Sean Javad Kamkar, Burbank, CA (US); Lingzhi Du, El Monte, CA (US); Saar Yalov, Los Angeles, CA (US); Jerome Louis Budzik, Altadena, CA (US)

(73) Assignee: ZestFinance, Inc., Burbank, CA (US)

( * ) Notice: Subject to any disclaimer, the term of this patent is extended or adjusted under 35 U.S.C. 154(b) by 30 days.

This patent is subject to a terminal disclaimer.

(21) Appl. No.: 18/648,707

(22) Filed: Apr. 29, 2024

(65) Prior Publication Data

US 2024/0303553 A1 Sep. 12, 2024

Related U.S. Application Data

(63) Continuation of application No. 18/310,658, filed on May 2, 2023, now Pat. No. 11,972,338.

(Continued)

(51) Int. Cl.
*G06N 20/20* (2019.01)
*G06Q 40/03* (2023.01)

(52) U.S. Cl.
CPC ............ *G06N 20/20* (2019.01); *G06Q 40/03* (2023.01)

(58) Field of Classification Search
CPC ............................. G06N 20/20; G06Q 40/03
(Continued)

(56) References Cited

U.S. PATENT DOCUMENTS

| 2012/0109821 | A1* | 5/2012 | Barbour | G06Q 40/02 705/44 |
| 2013/0144786 | A1* | 6/2013 | Tong | G06Q 20/4016 705/44 |

(Continued)

FOREIGN PATENT DOCUMENTS

WO 2021087129 A1 5/2021

OTHER PUBLICATIONS

Chen, et al. "Do you know your customer" Bank risk assessment based on machine learning, Applied Soft Computing Journal 86 (2020) 105779, 2020 (Year: 2020).*

*Primary Examiner* — Tsu-Chang Lee
(74) *Attorney, Agent, or Firm* — TROUTMAN PEPPER LOCKE LLP; Christopher J. Forstner; Nicholas J. Gallo

(57) ABSTRACT

This application describes systems and methods for generating machine learning models (MLMs). An exemplary method includes obtaining a sample and user input data characterizing a product or service. A subset of the data is selected from the sample based on sampling the sample according to the user input data. An MLM is trained by applying the data subset as training input to the MLM, thereby providing a trained MLM to emulate a customer selection process unique to the product or service. A user interface (UI) configured to receive other user input data and cause the trained MLM to execute on the other user input data, thereby testing the trained MLM, is presented. A summary of results from the execution of the trained MLM (Continued)

is generated and presented in the UI. The summary of results indicates a contribution to the trained MLM of each of a plurality of features.

18 Claims, 7 Drawing Sheets

Related U.S. Application Data

(60) Provisional application No. 63/364,089, filed on May 3, 2022.

(58) Field of Classification Search
USPC .......................................................... 706/12
See application file for complete search history.

(56) References Cited

U.S. PATENT DOCUMENTS

| | | | |
|---|---|---|---|
| 2014/0344186 A1* | 11/2014 | Nadler | G06Q 10/067 |
| | | | 705/36 R |
| 2019/0378210 A1 | 12/2019 | Merrill et al. | |
| 2021/0158085 A1 | 5/2021 | Budzik | |
| 2022/0058731 A1 | 2/2022 | Price et al. | |
| 2023/0107309 A1 | 4/2023 | Patel et al. | |

* cited by examiner

500

Features

Review   All

| | Rank | Feature | Importance | Direction | Source | Status | |
|---|---|---|---|---|---|---|---|
| ☐ | 1 | trade_months_since_openDate_m... Average months since open date on all credit card... | 2.30% | ⎯⎯\_ | trade | ⊗ Approved ▾ | ↻ |
| ☐ | 2 | trade_clAmt_all_non_derog_acct... Average credit limit amount on non-derogatory tra... | 1.64% | ⎯\__ | trade | ⊗ Approved ▾ | ↻ |
| ☐ | 3 | inq_inquiries_count_by_IndCod... Number of finance inquiries | 1.55% | ⎯⎯⎯ | inquiry | ⊗ Approved ▾ | ↻ |
| ☐ | 4 | trade_months_since_openDate_m... Average months since open date on all revolving ac... | 1.50% | ⎯\__ | trade | ⊗ Approved ▾ | ♡ |
| ☐ | 5 | trade_months_since_openDate_m... Minimum months since open date on all credit card... | 1.44% | ⎯\__ | trade | ⊗ Approved ▾ | ♡ |
| ☐ | 6 | trade_hc_to_cl_accts_with_rcnt... Maximum high credit to credit limit on accounts w... | 1.42% | ⎯/⎯ | trade | ⊗ Approved ▾ | ♡ |
| ☐ | 7 | inq_inquiries_count_by_month_... Sum of number of monthly inquiries | 1.33% | ⎯⎯/ | inquiry | ⊗ Approved ▾ | ♡ |
| ☐ | 8 | trade_hcAmt_mean Average high credit amount | 1.33% | ⎯\_ | trade | ⊗ Approved ▾ | ♡ |
| ☐ | 9 | trade_clAmt_with_hc_to_cl_gt_0... Minimum credit limit amount on credit card accoun... | 1.28% | ⎯\_ | trade | ⊗ Approved ▾ | ♡ |
| ☐ | 10 | trade_bInc_to_hc_active_accts_... Average current balance to high credit on active t... | 1.25% | _⎯/ | trade | ⊗ Approved ▾ | ♡ |

Items per page: 10 ▾    1-10 of 138 items                                    1 ▾ of 14 pages  ‹ ›

FIG. 5A

AUTOMATED SYSTEMS FOR MACHINE LEARNING MODEL DEVELOPMENT, ANALYSIS, AND REFINEMENT

CROSS-REFERENCE TO RELATED APPLICATIONS

This application is a continuation of, and claims priority under 35 U.S.C. § 120 to, U.S. patent application Ser. No. 18/310,658, filed May 2, 2023, which claims priority to U.S. Provisional Patent Application No. 63/364,089, filed May 3, 2022, the entire contents of which are fully incorporated herein by reference.

TECHNICAL FIELD

The disclosed technology generally relates to machine learning models and, more particularly, to automated methods and systems for building, analyzing, and refining customized machine learning models.

BACKGROUND

Machine learning models may be used to solve complex problems. Some machine learning models are deep models that employ multiple layers of models to generate an output for a received input. Neural network models, for example, generally include one or more layers that incrementally process input data to generate output data, with connections between layers being adjustable through incremental training to achieve target results. Other machine learning models are parametric models that generate an output based on a received input and model parameters.

In this and other ways, machine learning models may be adapted to solve difficult problems arising across disciplines, including image recognition, language processing and translation, navigation, and the like.

Machine learning model development, documentation, and adoption are notoriously laborious processes. For example, a great deal of time may be spent gathering the data required for model development and analysis, and the use of the gathered data to achieve desired outcomes requires expertise that many users lack.

Moreover, although machine learning models may be effective at processing large amounts of data and providing outputs that can be used toward the solution of complex problems, the models are widely understood to lack transparency, and to suffer from the potential for algorithmic bias. In that regard, a trained machine learning model is widely understood to resemble a "black box," in the sense that it produces outputs from inputs, but that the actual processing involved in producing those outputs is neither observable nor knowable to the user.

For example, although model configuration and parameters may be known, their inherent complexity and abstraction of machine learning models prevents direct understanding of how a given model may have produced one output value as opposed to another when executed. This problem, which fundamentally arises from the nature of machine learning models themselves, is particularly concerning when the outputs of the models are used to inform difficult decisions impacting human lives. Among other reasons, this is because machine learning models may harbor hidden and unintended biases and may also suffer from inaccuracies that are difficult to diagnose due to their lack of transparency.

SUMMARY

The technology described and illustrated herein generally relates to enhancing the capabilities of computer systems that generate, train and/or execute machine learning models, by enabling those systems to gather data and build tailored machine learning models for specific applications faster than would otherwise be possible, and to automatically analyze those machine learning models to identify and explain the outputs of those models in terms that human users can understand and act upon.

For example, this specification describes a system implemented as computer programs on one or more computers in one or more locations that generates customized machine learning models. Implementations automate the process of building customized machine learning models through a user interface. Such implementations represent a significant leap in AI model development platforms providing a unique model for building AI technology as a service for a specific task for which model development processes and procedures can be encoded as instructions for the machine to execute without requiring intervention by expert data scientists. Implementations described herein may advance the adoption of AI technology by companies and individuals that do not possess the computing power and specialized human resources to develop customized models in-house.

In an aspect, a method for generating a machine learning model includes obtaining first user input data characterizing a product or service provided by the user (e.g., credit cards, mortgage loans, personal loans, automotive loans, equipment loans, small business loans, and the like). The first input data includes a type of service provided by the user, region of operation, and business classification associated with the user (e.g., finance company, credit union, and bank). The system is configured to ask a business user a predetermined set of questions about the specific business application (e.g., underwriting new loans, evaluating the risk of existing loans, determining the size of revolving credit line, soliciting loan applications in marketing programs, and other applications without limitation) which determine downstream choices in the model development process, such as what data to use in the model, which predictive features to generate, how to label the observations based on the data, and how to analyze the model's predictive and economic performance for a particular business application. The questions presented are based on the specific modeling task and are retrieved from a database based on the user's selection of the task from a predetermined list of tasks. The system allows the user to select from a series of predetermined options.

For example, one task includes building a probability of default credit origination model for automotive loans. In this case, in embodiments, the system asks questions including the average value of a good loan and loss from a bad loan, the average length or tenor of the loan, and whether data related to the make model and mileage of the vehicle is available at decision-time. Another example of a task in some embodiments includes building a probability of default credit origination model for a new credit card account. In this embodiment, the system asks for relevant cost data like the cost of issuing the plastic credit card, the cost of transactions, credit limit by risk tier, APR and the like. Another example of a task in embodiments includes assigning the optimal interest rate and credit line for a credit card. Yet another example includes determining whether to decrease the credit line of a credit card account that has already been issued, in which case the system asks for policy information such as how often the bank allows credit lines to be decreased. Other tasks include marketing tasks such as determining the likelihood someone will respond to an offer for a loan via direct mail, internet advertising, and emails.

Questions can be posed to the end-user operating a user-interface and answers can be provided in structured or unstructured form. Each of the questions is stored in a database associated with the relevant task, and trees of questions are stored so that the next question the system asks is conditioned on answers to a prior question. The answers to these questions can be stored in a database that can be accessed later by the system when models are built and analyzed. In this way, the system may be configured to gather any relevant task-specific information so that an end-user can configure the downstream model training, evaluation, and analysis process, without requiring specific machine learning or data science skills. Software that encodes a parameterized model development and analysis process reads the stored answers to question and map them to a specific model development pipeline which is called with parameters such as the selected data sources, sampling parameters related to the data sources, feature engineering and selection methods, modeling target generation method, model type, model training method, model selection method, explainability method, model debiasing method, model performance analysis method, benchmark model development method, comparison methods, economic analysis methods, fairness and debiasing methods, compliance analysis methods, and documentation templates to be used in documenting the model development, compliance review, and validation processes). Among other benefits, the presently disclosed method makes it possible for business users to build and review complex models and let the system described herein determine the best combination of parameters to achieve the stated business goal based on computer-encoded expert domain knowledge and domain-specific data science knowledge. In embodiments this knowledge is encoded in configuration files and databases.

The method includes building models for the task of assessing credit risk of a borrower applying for a loan, such as an installment loan, credit card, auto loan, student loan, mortgage, or other form of loan. The method includes obtaining a sample of credit data related to consumer financial transactions. In some implementations, the sample of credit data is a nationwide sample of credit report data. Such data may be sourced from credit reporting agencies such as Equifax, Experian, or Transunion, or vendors of alternative credit data such as Lexis-Nexis, Clarity, L2C, DataX, and the like. In implementations additional data used to build models comes from the lender's core system which includes demand deposit account data such as the account opening date, average and maximum balance by month, series of total monthly debits and credits, and incidences of low balance and insufficient funds by month. The method includes leveraging keying and linking techniques to associate records about the same consumer across different databases based on predetermined or dynamically computed match keys stored in a configuration file to create joined credit data. The method includes selecting, from the sample of credit data, a subset of credit data based on sampling the sample of credit data according to the first user input data. The subset of credit data is selected by applying a first sampling criterion based on a first factor of the first input data, determining that the subset of the credit data, after applying the first sampling criterion, exceeds a predefined threshold, and applying a second sampling criterion based on a second factor of the first input data. In embodiments, the sampling criteria are provided by indication of the user (E.g., select a sample within a given geography, or people who applied and opened tradelines of a certain credit products type within a certain time frame, or with certain credit characteristics, e.g., credit score). In other embodiments, the sampling criteria are based on selecting the sample based on an autoencoder trained to reconstruct the lender's existing population using the method described in U.S. patent application Ser. No. 17/385,452, the contents of which are incorporated herein by reference. In this variation, the mean squared error of the autoencoder's output compared with the input defines a similarity metric that allows the system to identify new records that are similar to the lender's population (or selected subset of the population) as encoded in the trained autoencoder. The minimum degree of similarity required, or minimum count of records to be generated may be determined based on an input of the user.

Each type of modeling task corresponds to a plan with predetermined steps. Each step may be executed only if certain preconditions are met. In implementations, each step implements a public interface requiring instances of steps implement an applies( ) method, and an execute( ) method. The applies method checks whether the preconditions necessary to execute the step are met. The execute method executes the step. The applies function may read from a database or knowledge graph such as the knowledge graph disclosed in U.S. patent application Ser. No. 16/394,651, the contents of which are incorporated herein by reference. The execute method can read and may side-effect (write to) the same database. Sequences of side effects that must be committed simultaneously can be managed via namespaces and transactions. An executor executes a modeling plan by looping through all the steps; if a step applies, it is executed. Each step may add additional steps to the plan, and the executor loops through all the steps until none apply.

In implementations, a step may include an unsatisfied preconditions method that returns a list of unsatisfied preconditions, the preconditions of a step that currently evaluate to false. In implementations each precondition has a description which may include the data source which may be one of input data, intermediate output, user input, and so on. The description may include a data source, a human-readable description, charts, tables, and lists of questions and response options, stored in a dictionary or JSON format. In embodiments, if the only unsatisfied preconditions to a step include user inputs, the system may be configured to prompt the user for those inputs, displaying the information, questions and prompts contained in the precondition's description. In this way, the system can easily be extended with dynamic plan steps preconditioned on facts about the input data, user inputs, or outputs of prior modeling and analysis steps.

It will be appreciated by those with ordinary skill in the art that the presently disclosed method may be easily extended to other tasks, such as fraud detection, marketing, collections, account management or predicting likelihood to accept an offer, and other financial and behavioral data may be sourced. For example, in a fraud detection use case, data might include time on the website, frequency of visit, or referral traffic source and be specified as a precondition to a feature engineering step related to the fraud detection modeling task. These data sources may be included as preconditions to a fraud modeling step in the fraud modeling task, and the location of the data also a precondition, represented as a required user input. In other applications, different questions may be asked during the computer-mediated interview process. For example, for a credit line decrease modeling task, the computer-mediated interview process may include prompting the user to select the method of calculating interest revenue foregone for erroneous line decreases on good accounts and the method of calculating the amount of loss prevented on bad accounts. These user inputs may be listed as preconditions for the analysis step that calculates the profitability of the line decrease program for a model. For each predetermined task, the presently-described method includes describing a series of conditional steps that comprised of executing modeling tasks and also soliciting the required input from a business user to provide the information necessary for the computer-implemented system to complete the required model build, analysis, documentation, deployment and monitoring processes.

In some cases, the system may prompt for user input based on the outcome of a modeling step. For example, many modeling tasks aim to maximize more than one performance metric, and performance metrics may have trade-offs. For example, the loss from a bad loan in the first 6 months might far exceed interest earned during that time period, but a loan that goes bad after many years may be profitable. In this case, total risk-adjusted profitability can capture the interaction between the loan amount, term, interest rate, and loss curve. In other cases, such as fair lending analysis and model selection, there may be a tradeoff between predictive accuracy and certain measures of fairness (as described in U.S. Pat. No. 10,977,729, the contents of which are incorporated herein by reference). User input may be required to determine which of a series of less discriminatory alternative models to document for model review. The presently described system provides such a means. LDA search can be represented as a step that produces a series of candidate LDA models. LDA model analysis can be represented as a step that requires candidate LDA models and an indication from the user as to which LDA model to analyze. When the executor evaluates unsatisified_preconditions the result would include only the indication from the user as to which LDA to analyze, causing the system to prompt the user. In this way, the system can chain together steps that require outputs of prior steps and that require indications from the user.

The method includes training a machine learning model by applying the subset of credit data as training input to the machine learning model, thereby providing a first trained machine learning model to emulate a customer selection process unique to the product or service provided by the user. The method includes selecting the subset of training data based on modeling task (e.g., an automotive originations model requires automotive tradelines from the credit report vs. a credit line decrease model which requires credit card transactions and all tradelines).

The method includes presenting, to the user, a user interface (UI) configured to receive second user input data and cause the first trained machine learning model to execute on the second user input data, thereby testing the first trained machine learning model.

The method includes presenting, to the user and in the user interface, data representing a summary of results from the first trained machine learning model. The summary of results includes feature importance of each feature used in the first trained machine learning model. In embodiments, the summary of results includes the statistical performance of the model, the economic impact on the associated lending business (e.g., increase in approval/decrease in losses) and dollar estimates based on inputs received from the user (e.g., increase in profit from interest, net new customers and LTV, customer acquisition cost, reduction in losses per year). In embodiments the summary of results includes a comparison with a benchmark model or existing process. In embodiments the existing process in the comparison step is represented by a model trained based on historical data reflecting the existing process. In other embodiments, the summary of results includes fairness analysis and compliance metrics. In embodiments the summary of results includes a link to a model development document that includes details of the automated model development process. In embodiments, the results summary includes documentation as described in U.S. patent application Ser. No. 16/394,651, the contents of which are incorporated herein by reference.

In some embodiments, the method includes obtaining, from the user, a third set of user input data comprising actual customer data associated with the product or service provided by the user. The method includes showing the user a summary of the data submitted in a user interface so that the user can check for errors in the submitted data. For example, when the user submits loan performance data to the system, the system can provide output indicating the average approval rate, acceptance rate, default rate, average APR, loan term, etc., to allow the end user to determine whether the data submitted reflects their understanding of their business. In this way, the user can ensure data submitted is free from obvious errors and omissions.

In some embodiments, the method includes retraining the first trained machine learning model by applying at least the third user input data to the first trained machine learning model, thereby providing a second trained machine learning model that is a refined version of the first trained machine learning model. In other embodiments, the second trained machine learning model is comprised of an ensemble of submodels including the first trained machine learning model and a third machine learning model trained on the third user input data. In embodiments, the submodels scores of the ensembled second trained machine learning model are combined based on a linear combination. The method includes computing ensemble weights, wherein the ensemble weights specify weights assigned to each model and generating the second trained machine learning model by combining two or more models based on the ensemble weights. In some embodiments the ensemble weights are coefficients of a linear combination. In embodiments the method of computing ensemble weights is a ridge regression logistic model. In embodiments, the ensemble function of the ensembled second trained machine learning model is a neural network as described in U.S. patent application Ser. No. 16/688,789, the contents of which are incorporated herein by reference.

In implementations, the third set of inputs comprises more detailed sampling criteria that allows the system to gather credit bureau records that reflect the lender's historical performance. These more detailed sampling criteria include percentage applied, default rate by product and credit score bin, approval rate by product and credit score bin, average and standard deviation loan amount by product, average and standard deviation APR by product. For example, a lender could specify the following detailed sampling criteria:

| Detailed Sampling criteria for a specific lender: Auto Loans in the State of Georgia | | | | | | |
|---|---|---|---|---|---|---|
| Tier | Credit Score Band | Pct of Total Applied | Pct of Total Approved | Default Rate | Loan Amount | APR |
| Super Prime | >750 | 10% | 20% | 2% | $35,000 +/− 5,000 | 2% +/− 1% |
| Prime | 660-749 | 50% | 70% | 3% | $25,000 +/− 5,000 | 6% +/− 1% |

-continued

Detailed Sampling criteria for a specific lender:
Auto Loans in the State of Georgia

| Tier | Credit Score Band | Pct of Total Applied | Pct of Total Approved | Default Rate | Loan Amount | APR |
|---|---|---|---|---|---|---|
| Near Prime | 620-659 | 30% | 10% | 5% | $20,000 +/− 5,000 | 9% +/− 1% |
| Sub Prime | <620 | 10% | 0% | N/A | N/A | N/A |

Using these detailed sampling criteria, the system can select records from a large database of credit reports to construct a modeling and validation dataset that mirrors the lender's specific population. The selected credit reports may then be keyed and linked to other data about the same consumer such as checking account and savings account data. The advantage of using detailed sampling criteria versus using loan-level data from the lender is that use of sampling criteria avoids the time required to obtain authorization to gather and transfer sensitive loan-level information from the customer.

In other implementations, the third set of inputs is created based on querying the credit bureau for records of loan applications (inquiries) and funded loans for the specific lender. This approach is advantageous because it only requires authorization on behalf of the lender to enable the exchange of loan-level data specific to that lender. In implementations this data is then further keyed and linked with other data from other sources about the same borrowers.

The subject matter described in this specification can be implemented in particular embodiments so as to realize one or more of the following advantages.

Automated systems for machine learning model development, analysis, and refinement accelerate the model development process, e.g., by building a "lookalike" model and then optionally refining the model. Refining the model by taking additional data (such as customer-specific data) into consideration not only improves the model accuracy (thus reducing the time it would take to retrain the model to achieve a desirable performance), but also saves computational time, power, and resources needed for developing the model because alternative model developments would require massive amounts of (customer-specific) data, which requires excessive use of processing and network resources to obtain and store. Furthermore, depending on the size of the customer, such data may not be available. For example, one lender gave only 1500 loans per year. 5 years' worth of data would not have been enough to build and validate a machine learning loan originations model. By sampling a larger database of credit reports to find similar applicants, the present method can build a more reliable model. In addition, a method of preparing training data to produce a model predictive of a particular (customer) population utilizes a sampling approach, thereby reducing computational time, power, and resources required to build customized machine learning models.

In one example context, customized credit models that predict the risk of a loan applicant (e.g., for a credit card, personal loan, automotive loan, mortgage), tailored machine learning models for particular application type (e.g., a type of loans, a type of lenders) can lead to increases in approval rates due to the model's improved predictive power in assessing the applicant's credit risk. The increased approval rates then leads to increased operational efficiencies by reducing the number of bad new loans and increasing the number of good new loans, where "good" and "bad" indicate the applicant (borrower)'s history of paying the loan on time. Furthermore, small (lending) businesses can benefit from the methods described herein, because they do not require a large database of prior records (e.g., historical loan origination and performance information). Therefore, customized modeling of customer behavior can provide significant benefits for various business that do not have the computing resources to develop customized models strictly from their own private data. The unique AI model building and analysis interface, described herein, that leverages public and private data for model customization and training to overcome such technical obstacles will likely prove beneficial to small businesses seeking to use machine learning models to improve business results.

The disclosed method and system can be used to construct a broad range of tailored machine learning models (not specific to credit models); the advantages outlined above are also applicable to these models as well.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 5A-5B show example user interfaces for analyzing feature contributions.

DETAILED DESCRIPTION

Figure 1:
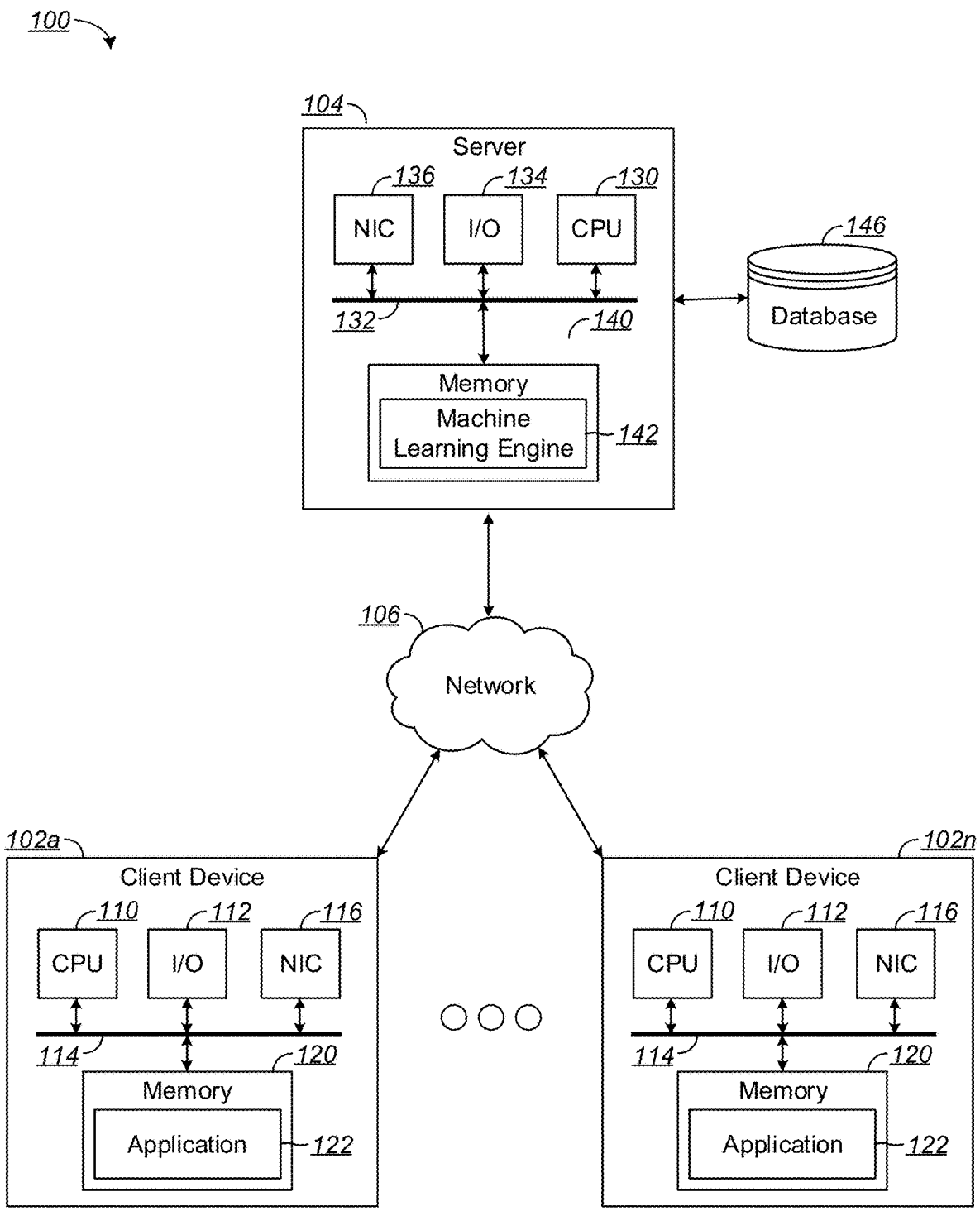
FIG. 1 shows an example computing environment.

This specification describes approaches to and a system of generating a domain-specific machine learning model. The domain-specific machine learning model refers to a model tailored for a particular application. Such particular applications can include, but are not limited to, models for predicting agricultural risk (e.g., crop growth/yield), models for predicting network risk (e.g., network outages), and models for predicting a loan applicant's risk (referred to as a credit model or credit risk model). Within the credit risk domain, specific applications include: underwriting models that estimate the probability a borrower will become delinquent on a loan; marketing models that estimate the likelihood of the customer responding to an offer sent via direct mail, getting approved when they apply, and actually booking a loan or activating a card; credit card line decrease models that estimate the likelihood of default after a credit card has been issued; loss forecasting models; and collections models that determine the likelihood of a delinquent loan being repaid given a treatment such as a call from a bill collector. Models are used in business processes such as a credit card approval process in which a borrower applies for a credit card via a branch or online credit card application, and the credit card is granted or denied based on the model's assessment of the credit risk. When the model assesses the applicant to be low risk, and the credit card application is granted based on a model score lower than a predetermined threshold, the system sends the consumer a physical credit card which may then be activated and used by the consumer. When the credit card application is denied because the model score is higher than a predetermined threshold, the system sends the consumer a notice of adverse action containing the reasons they were denied. The presently described system and method enables business users to develop models that are used to enable such automated granting and declining of credit card applications. Each specific modeling application requires specific data and introduces specific, application and task-specific constraints into the modeling and analysis process. In the presently-described system and method, the modeling task determines the definition of the model predictors (variables used to predict the outcome including the method of computing the variables from the source data), definition of the modeling target (the outcome the model is predicting), economic analysis (e.g., increase in profit from using the model) and the contents of associated regulatory reports.

Generating the domain-specific machine learning model includes building a first model ("lookalike model") corresponding to the modeling domain and the customer's characteristics (e.g., model type, customer's business type and location). For example, an underwriting model for credit cards for super-prime (e.g., FICO>740) customers in the state of Georgia. The lookalike model is a model trained on sampled training data, where sampling is applied to ensure the sampled training data are relevant for a particular application. Continuing with the credit card underwriting model example, the system would automatically select records corresponding to consumers with high credit scores who had opened credit cards in the state of Georgia within a predetermined time frame (e.g., 36-24 months ago), and records corresponding to those same consumers 24 months after the origination date (to determine whether they went more than 90 days delinquent within 24 months of opening their credit card account). The training data are used to build a model that predicts whether a consumer applying for a credit card is likely to repay. For example, again in the credit card origination modeling task, the specific predictors used in the model can be pre-determined based on their relevance to the credit underwriting task. For other tasks, other predetermined features (predictive variables) are selected and computed. The relevance of a predictive variable to a task may be established by expert knowledge and common practice or be based on empirical results from automated and manual tests that evaluate new data attributes for a given modeling task.

In some implementations, the lookalike model is further refined by a model ("client model") based on domain-specific data (e.g., customer-specific historical data such as historical crop growth/yield, historical network outages, or historical loan applications). The client model may be combined with the lookalike model in an ensemble to produce a final score. For the aforementioned example of the credit card underwriting model, the client model is combined in a linear combination (weighted average) with the lookalike model to produce a credit risk score for each loan applicant.

The systems described herein for building customized machine learning models can be employed to build AI models for various different contexts and uses. However, the remainder of the discussion will be focused on one exemplary context—the automated customization of credit underwriting models. Embodiments described in this specification have following advantages. Embodiments speed up the model development process by minimizing data-gathering process through a sampling process and an incremental refinement process (e.g., by generating a refined ML model). The sampling process builds a lookalike model based on the task/application and the user's business, but the model is also based on a lookalike sample instead of the lender's specific loan applicants and loan performance data. One embodiment employs a multimillion-record credit data from a 48-month window from each of the three national credit bureaus: Equifax, Experian, and TransUnion. In embodiments, the sample is constructed based on quarterly credit report archives. In other embodiments, the credit report archives are monthly or weekly. The archives are selected to ensure there are new loan applications of each loan type of interest reflected each quarter and that each subsequent quarter the credit reports from the applicants from the prior quarters are included. This approach of selecting the archives used in the national sample allows determining when and whether any of the applicants that applied for credit and were granted a loan paid on time or went delinquent. In embodiments, a business analyst accesses a graphical user interface (e.g., web-based) to build models. The system prompts the business analyst to enter information related to their lending business. This information can include primary and secondary credit bureau, region of operation (e.g., cities and states where the lender currently operates), type of loan offered (e.g., credit card, personal loan, mortgage), and for each loan, statistics (e.g., average, min, max, deciles) related to the loan amount, credit score, and payments and delinquencies (e.g., payment amount, time since origination). In embodiments, model development data is constructed based on a subsample of the national sample that is sampled based on the criteria specified by the business analyst user in a graphical user interface.

FIG. 1 shows an example computing environment 100. The system 100 includes a plurality of client devices 102*a* through 102*n* (e.g., mobile phones, laptops) in communication with a server 104 via a network 106, which may be a wired or wireless network or any combination thereof. Each client device 102*a* through 102*n* (referred to collectively as client devices 102) includes a processor (e.g., central processing unit) 110 in communication with input/output devices 112 via a bus 114. The input/output devices 112 can include a touch display, keyboard, mouse, and the like.

A network interface circuit 116 is also connected to the bus 114 to provide wired and/or wireless connectivity to the network 106. A memory or other storage medium 120 is also connected to the bus 114. The memory 120 stores instructions executed by the processor 110. In particular, the memory 120 stores instructions for an application 122, such as a web browser application, which communicates with the server 104. In some implementations, each client device 102 is a mobile device (e.g., smartphone, laptop, tablet, wearable device, digital assistant device, etc.) executing the application 122. Different client devices 102 are operated by different users that use the same application 122. For an example of credit model, users can be credit lenders such as banks. The application 122 can include one or more electronic resources including a mobile application and a web environment displayed by a browser program.

The server 104 includes a processor 130, bus 132, input/output devices 134 and a network interface circuit 136 to provide connectivity to the network 106. A memory 140 is connected to the bus 132. The memory 140 stores a machine learning engine 142 with instructions executed by the processor 130 to implement operations disclosed in connection with FIGS. 2 through 6. In some implementations, the system 100 includes a database 146 in communication with the server 104 that stores information for use by the application 122 and/or the machine learning engine 142.

The machine learning engine 142 implements machine learning techniques, e.g., training a credit risk model, applying the model to predict the credit risk of loan applicants, and refining and retraining the model as necessary (described in more detail below). The database 146 can include user information (e.g., identifier of the user) and training data (e.g., historical loan applications, credit reports). In some implementations, for secure data management, data in the database 146 are encrypted and/or anonymized. For example, historical loan applications are encrypted and can be decrypted with an encryption key that the designated user(s) has access to. In embodiments, the historical loan applications and credit reports are de-identified so that they do not include personally identifiable information such as name and address. In embodiments, the credit reports are augmented with protected class probabilities (e.g., likelihood the subject of the credit report is of a given race/ethnicity, gender, or age). In embodiments the protected class probabilities are assigned using an imputation method such as BISG (Baeysian Improved Surname Geocoding) or other imputation method, such as described in Imputation of Race/Ethnicity to Enable Measurement of HEDIS Performance by Race/Ethnicity Published in: Health Services Research, Volume 54, Issue 1, pages 13-23 (February 2019). doi: 10.1111/1475-6773.13099 by Ann C. Haas, Marc N. Elliott, Jake Dembosky, John L. Adams, Shondelle Wilson-Frederick, Joshua Mallett, Sarah J. Gaillot, Samuel C. Haffer, Amelia Haviland, which is incorporated herein by reference in its entirety.

The machine learning engine 142 can require the encryption key to perform particular tasks that require access to the training data such as retraining the model. In embodiments, the data and processing steps are encoded in a blockchain or distributed ledger.

In some implementations, the system 100 processes information in the database 146 (e.g., by generating fast-access identifiers or references) such that the access to the information is computationally efficient. For example, the system 100 can apply the filter of a particular user to the database 146 to obtain records associated with the particular user. In some implementations, the system 100 optimizes a structure of the database 146 based on a data processing bandwidth to facilitate load balancing and efficient processing of data.

Figure 2:
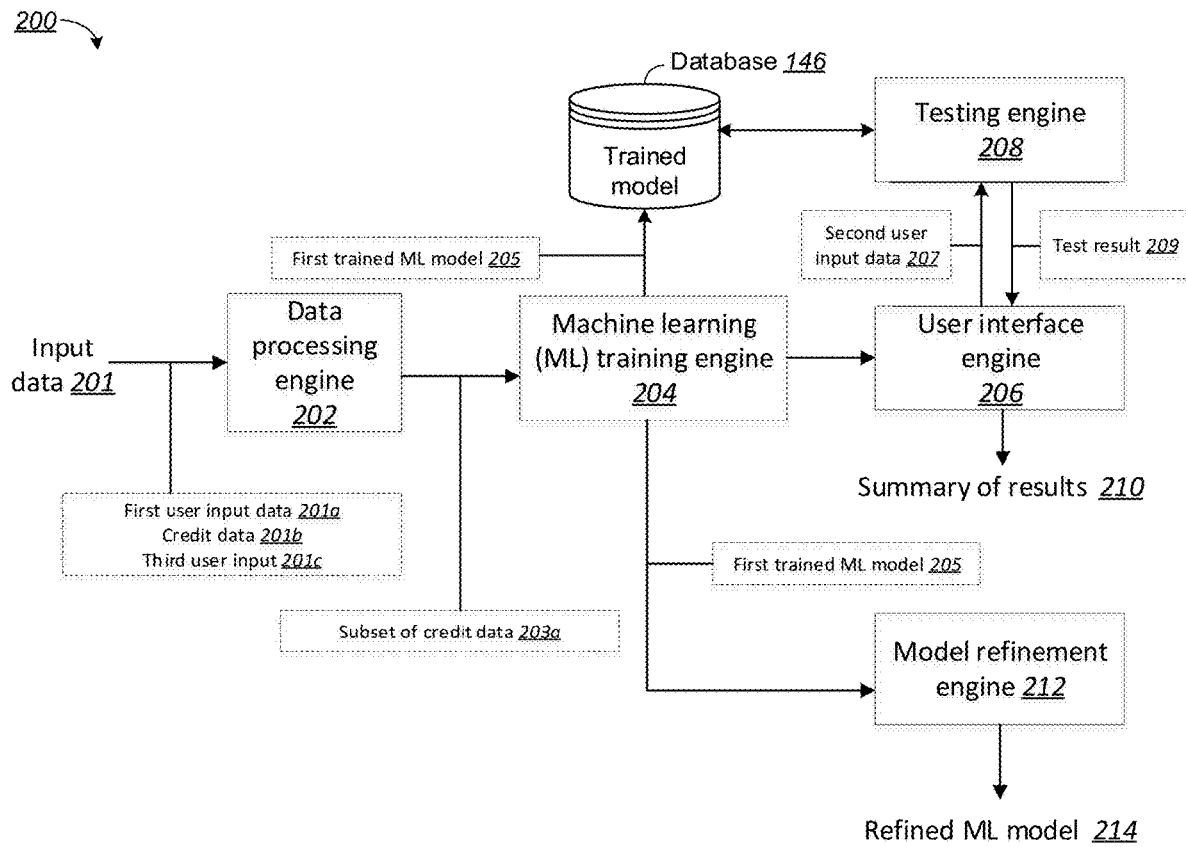
FIG. 2 shows an example system.

FIG. 2 shows an example system 200 for generating a refined machine learning (ML) model 214. The refined ML model considers not only non-user-specific data (e.g., credit data 201b), but also user-specific data (e.g., third user input 201c). Incorporation of two different data sets improves efficiency and efficacy of modeling by increasing predictive accuracy of the model and decreasing time and resources required for training.

The system 200 includes a data processing engine 202 that is configured to receive input data 201 and outputs processed input data. The input data 201 includes a first user input data 201a characterizing a product or service (e.g., personal loan) provided by the user (e.g., bank), credit data 201b, and actual customer data associated with the product or service provided by the user (referred to as a third user input 201c; described in more details below). In some implementations, the first user input data 201a is stored in a declarative representation in a configuration file (e.g., a JSON file). The data processing engine 202 can extract relevant information from both unstructured and structured data, e.g., by utilizing natural language processing and/or translating the input data 201 to other languages, or by extracting data from client's existing systems (such as a Loan Origination System, or Core system) whether hosted on premise at the client or in the cloud.

In some implementations, the data processing engine 202 selects a subset of credit data 203a from the credit data 201b, based on sampling the credit data 201b according to the first user input data 201a. Sampling the credit data 201b decreases time and cost it takes to acquire and process the data 201b. The data processing engine 202 can perform an entity-based sampling based on the first user input data 201a. That is, the subset of credit data 203a includes data from applicants similar to those who use the product or service provided by the user. For example, the data processing engine 202 samples based on the user's region of operation, a part of the first user input data 201a. The data processing engine 202 can further sample based on other factors including a type of product or service and an applicant's credit score and loan amount. The data processing engine 202 can perform a data-based sampling, where the data-based sampling prioritizes selecting the credit data similar to that of the user. For example, the data processing engine 202 computes a similarity metric by comparing historical loan applications from the database 146 with each of the credit data 201b and samples based on the similarity metric. In some implementations, the data processing engine 202 applies both the entity-based and data-based samplings.

In implementations, the development data sample is constructed based on the user input. In some implementations, the sampling process starts with the exact criteria specified by the user and proceeds to include additional geographies, credit products, and populations based on predefined sampling relaxation steps, in order to satisfy a set of predetermined constraints. In some implementations the sampling constraints can include a minimum number of observations, a minimum number of bad loans, a minimum number of loan applications or a minimum number of funded loans from at least one demographic segment. In embodiments, the sampling relaxation steps include sampling from additional surrounding states, or similar credit products. For example, if the number of rows required by a minimum rows sampling constraint is not achieved by sampling department store credit card borrowers in the state of North Dakota, the sample may be expanded to include all credit card borrowers in the state of North Dakota. If the number of rows required by the minimum rows sampling constraint is still not achieved, the sample would be expanded to include all credit card borrowers in the states of North Dakota and South Dakota. If the number of rows required by the protected applicant sampling constraint is not achieved for e.g., African American borrowers, the sample would be expanded to include borrowers from Minnesota. In this way, sampling can be used to ensure the model has adequate support for all segments of interest including historically under-represented groups such as African American, Latinx, American Indian and Alaskan Native or women borrowers.

In implementations, the sampling process includes a set of rules that relax the sampling criteria, which are applied iteratively until the sampling constraints are met. Expansion strategies are associated with sampling constraints in a declarative representation such as JSON. For example, the following JSON representation specifies the two constraints described above

```
constraints = [{ name: minimum-row;
        min-rows: 100,000;
        expansion-strategies: [ neighboring-geographies,
```

-continued
```
similar-products ] },
        { name: minimum-protected;
            min-rows-per-protected-class: 5,000;
            expansion-strategies: [ neighboring-geographies ] } ]
```

Each expansion strategy calls an associated function that expands the user-specified selection criteria based on a set of predefined rules until all of the specified criteria are satisfied or no further expansions are possible.

The system 200 includes a machine learning (ML) training engine 204 that is configured to receive the subset of credit data 203a and outputs a first trained ML model 205. The first trained ML model 205 is also referred to as a lookalike model (as it emulates a customer selection process unique to the product or service provided by the user). The ML training engine 204, based on a user selected model build and documentation template, computes the modeling target for each sample. The user selected model build and documentation template reflects the first user input data 201a including the type of loan, average credit score, loan amount. In examples, the ML training engine 204 selects loans originated at least 24 months from the last date in the sample and obtains subsequent credit data associated with each loan. The ML training engine 204 determines that the loan was current at each archive date subsequent to the date of origination and assigns a binary target to each of the loans based on a user-selected target definition or a target definition associated with the user-selected modeling task. For example, when the user selects an automotive lending modeling task, for loans that were delinquent for 60 or more days, the ML training engine 204 assigns a label "bad"; for loans that were repaid or had no delinquency, the ML training engine 204 assigns a label "good." Based on these labels, the ML training engine 204 builds the first trained ML model 205, e.g., by using a supervised ML algorithm such as logistic regression, random forest, gradient boosted decision trees including xgboost and gbm, neural network, multi-layer perceptron, deep neural network, or ensembles and compositions thereof.

In some implementations, the ML training engine 204 builds multiple lookalike ML models based on different dependent variable targets. The different dependent variable targets (affecting the labels) may be associated with a specific modeling task such as predicting the likelihood of default on a credit card loan at the time of origination or predicting the likelihood default on a credit card after origination, or the likelihood of default on an auto loan, personal loan, mortgage loan, student loan, or the like. Binary classification modeling targets include 60 days or more delinquent in the first 6 months, 60 days or more delinquent in the first 18 months, and 60 days or more delinquent in the first 24 months. In some implementations, the ML training engine 204 uses a gradient boosting decision tree. In some implementations, the ML training engine 204 uses a neural network. In some implementations, different models (referred to as submodels) are combined via an ensemble function (e.g., a linear combination of scores from the submodels, where the linear weights are determined based on a ridge regression, where each input row is a model score and a learning objective is to minimize classification loss for a binary target). In some implementations, the ensemble function is a neural network trained based on submodel scores and the inputs to the submodels. In some implementations, the binary target is 60 days or more delinquent in the first 24 months. In some implementations, the target is a regression target; the model predicts the amount of the loss. In some implementations, the ensemble function is a nonlinear function, e.g., a neural network. In implementations, the model that maximizes predictive performance and stability over time on held-out data is selected and stored in the database 146.

In some implementations, the model selection process is automated based on predetermined selection criteria. For example, in some implementations the automated selection criteria is a linear combination of an area under the curve (AUC) on a holdout dataset, population-weighted adverse impact ratio on a hold dataset, variance of AUC over protected classes, and the variance in AUC over time (month over month) in the hold out dataset. In other implementations, the model selection process is based on a user selection of a model variation via a web-based or graphical user interface.

Applicant's prior patent application (U.S. Ser. No. 17/104,616 published as US Pub No. US2021/0158085A1) describes the details of the model building and documentation process by the ML training engine 204. US Pub No. US2021/0158085A1 is incorporated herein by reference in its entirety.

The system 200 includes a user interface engine 206 that presents a user interface (UI) configured to receive second user input data 207 and cause a testing engine 208 to test the first trained ML model 205 by executing the model 205 on the second user input data. The user interface engine 206 prompts the user to provide the second user input data 207 indicative of the user's customers for validation of the first trained ML model 205. The testing engine 208 applies the first trained ML model 205 stored in the database 145 on the second user input data and outputs a test result 209. The test result 209 includes performance of the first trained ML model and estimated economic impact on the user. The user interface engine 206 receives the test result 209 and provides a summary of results 210 on the UI. The UI including the summary of results 210 is described in more details, referring to FIG. 4 below.

The system 200 includes a model refinement engine 212 that optionally refines the first trained ML model with the user-specific data. In some implementations, the model refinement engine 212 uses the ML training engine 204 to train a new ML model on the third user input 201c (actual customer data associated with the product or service provided by the user). This ML model is referred to as a client model, because the user/client-specific data are included for training. The model refinement engine 212 combines the first trained ML model 205 (the lookalike model) and the client model to generate a refined ML model 214.

In some implementations, the refined ML model 214 is a model ensemble comprised of the lookalike model and the client model. As mentioned above, two (or more) models can be assembled by a linear combination of scores from the submodels (where the weights are determined by the regression) or by a nonlinear function of scores. In some implementations, the models are combined using a neural network.

Figure 3:
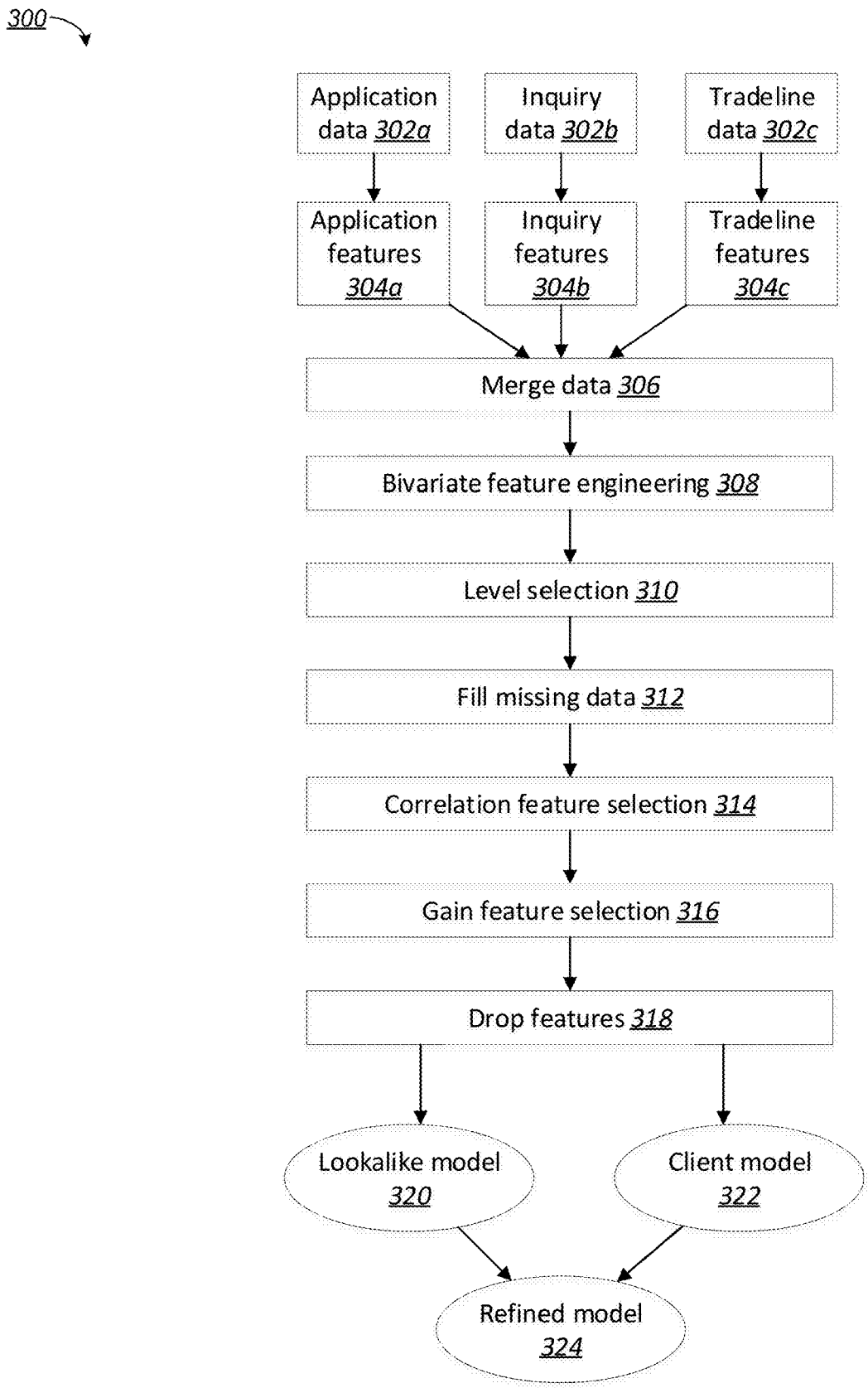
FIG. 3 shows an example architecture.

FIG. 3 shows an example architecture 300. The architecture 300 is an example configuration of generating the refined ML model 214. The system can train one or more prediction models, namely the lookalike model and the client model.

The system receives input data including application data 302a, inquiry data 302b, and tradeline data 302c. The application data 302a include data from the loan applications (e.g., loan amount). The inquiry data 302b include data from credit inquiries (which occur when a prospective borrower applies for a loan and the lender sends an inquiry to a credit bureau). The tradeline data 302 include data from multiple credit accounts or tradelines that may be open now or in the past. In some implementations, the system determines a set of data sources based on the system's knowledge of which data source is available via APIs and knowledge of which data sources are the most predictive for a given modeling task. For example, for a credit union credit card origination model, credit card tradelines associated with credit unions are selected by the system, but for an online installment loan product unsecured tradelines associated with all business types are selected. In implementations, this knowledge is encoded in declarative configuration files (JSON) associated with each modeling task. The system extracts features from data 302a, 302b, and 302c and obtains application features 304a, inquiry features 304b, tradeline features 304c and other features (such as collections, public records, etc.).

The system merges different features (306) using a unique identifier for each applicant. The system performs bivariate feature engineering (308) by creating a new feature from two existing features through mathematical computations (e.g., sum, subtraction, product, ratio, maximum, minimum). For example, the system generates a bivariate feature "debt to income" from the ratio of total debt to total income.

The system performs level selection (310) to prevent model overfitting. The level selection reduces the number of levels in categorical variables by taking categorical features and combining particular values to one value given a threshold. After applying the threshold, categorical features can be encoded using one-hot encoding, where the presence or absence of a specific value is encoded as a binary flag.

The system fills missing data (312). In some implementations, missing data are filled with certain values, e.g., −1. In some implementations, missing data are imputed with a statistic such as the mean or median.

The system performs correlation feature selection (314). The correlation feature selection uses correlation between two features (e.g., Pearson correlation coefficient) to eliminate redundant features (thereby making the model less complex and more interpretable).

The system performs gain feature selection (316). The gain feature selection evaluates how different sets of features contribute to model performance. The gain feature selection returns the optimal set of features by comparing model performances (e.g., area under the curve (AUC)) of the model built using the full set of features with models built after removing one feature at a time, starting with the least important and proceeding to most important features. In implementations, feature importance is given by Shapley values, SHAP values, TreeShap values, Integrated Gradients, or Generalized Integrated Gradients, depending on the specific model structure being analyzed. When the AUC drop exceeds a predetermined threshold, feature reduction by gain feature selection stops and the features left are used in the model.

The system drops features (318). The system receives the result of the feature selection and engineering and drops features including redundant features and non-predictive features. The system drops features that appear on an exclusion list. In implementations, the exclusion list is updated based on regulatory and legal guidance, by input of the user in a user interface, or based on automated disparate treatment analysis. In implementations, the automated disparate treatment analysis is conducted by testing whether a protected basis (age, gender, race/ethnicity) can be predicted using a model on the basis of each feature on its own, with an accuracy or AUC exceeding a predetermined threshold. For features for which such accurate predictions are possible, disparate treatment exists and the feature is dropped. In implementations, the model used to test for disparate treatment is a gradient boosting model such as a lightgbm model or an xgboost model. In other implementations, the criteria for disparate treatment is Pearson correlation.

The above steps are applied to build a lookalike model 320 and, optionally a client model 322. In implementations, the system builds a refined model 324 by ensembling the lookalike model 320 and the client model 322. Building models are described above, referring to FIG. 2.

Figure 4:
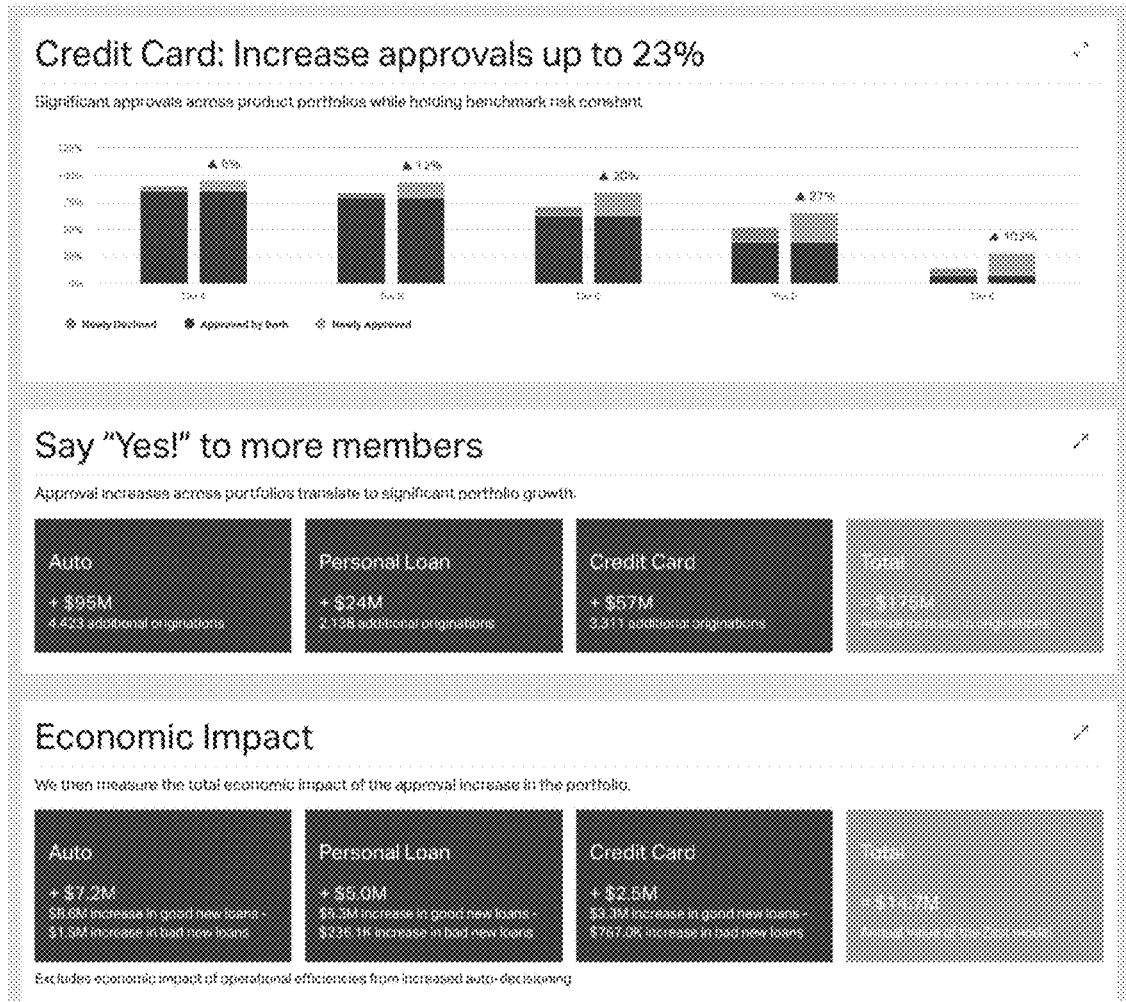
FIG. 4 shows an example user interface.

FIG. 4 shows an example user interface for testing the first trained machine learning model. The user interface is configured to receive user input data and cause the first trained machine learning model to execute on the user input data. For example, the user interface prompts the user to provide a set of customers (e.g., loan applicants) to validate the first trained machine learning model against the user's specific population. The user can upload a set of personal information related to past loan applicants; the personal information includes first name, middle name, last name, residence address, social security or government identification number, and date of birth. The personal information is associated with loan application data including the date of the application. The system retrieves credit reports associated with these users from the selected credit bureau at the date of application and a specified time period later (e.g., 3 months), where the specified time period is based on the user input on a modeling target. For example, if the modeling target is 60 or more days delinquent within the first 18 months, for each loan applicant, the system requests a credit report corresponding to the date of application and a report dated 21 months later (to allow 3 months for a reported delinquency to be reflected on the consumer's credit report). The system applies the first trained machine learning model on the user's specific population and determines how the model performs. On the user interface, referring to FIG. 4, data representing the summary of results from the first trained machine learning model are presented. The summary of results includes estimated economic impact as a result of deploying the model. The system constructs a portfolio based on the new model and compares the new portfolio with a portfolio constructed using a standard credit score. The new model will lead to an increase in approvals for loans that repay and a decrease in approvals for loans that go delinquent. The economic impact of these swaps is presented to the user on the graphical user interface. The economic impact is computed based on a predetermined computational graph associated with each loan application (e.g., credit cards, automobile loans, and the like).

In other implementations, the user specifies detailed selection criteria as described above. The detailed selection criteria are used to create a validation dataset that matches the distribution specified in the detailed selection criteria. The process in the preceding paragraph proceeds based on the validation dataset constructed based on the detailed selection criteria. In other implementations, the user signs an authorization and provides the lender's credit bureau member or customer ID, and the system retrieves the lender's loan applications and loan performance based on the lender's credit bureau customer ID. The process described in the preceding paragraph proceeds based on the validation dataset constructed based on records retrieved based on the lender's credit bureau customer ID.

Figure 5B:
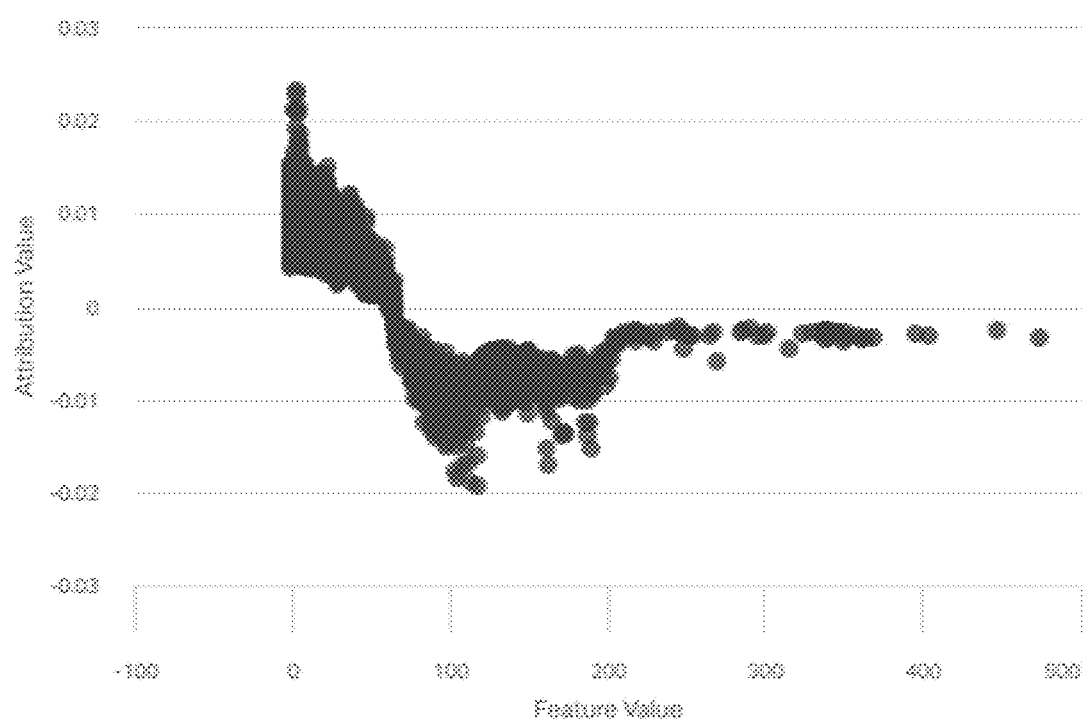

FIG. 5A-5B shows example user interfaces that visualize feature contributions. The user can review the model variables and relationships between the value of a variable and the risk score on a user interface. Referring to FIG. 5A, the user interface displays the importance of each feature (also referred to as feature contributions). For example, among 139 features used in training the model, "average months since open date on all credit card accounts" has 2.3% contribution to the risk score with a downward direction shown under "Direction" (longer average months indicate, on average, a lower predicted risk of the applicant). The user can approve/reject each feature by selecting a user selectable element next to each feature under "Status" column; rejecting a particular feature can prompt retraining the model by excluding the rejected feature (described in more details below). Applicant's prior patent applications (U.S. Ser. No. 16/434,731 published as US 2019/0378210A1; U.S. Ser. No. 16/688,789 published as US 2020/0265336A1; U.S. 63/046, 977) describe the details of computing the importance of each feature using Shapley-based methods. US Pub Nos. US 2019/0378210A1 and US 2020/0265336A1, and Application No. 63/046,977 are incorporated herein by reference in their entirety.

FIG. 5B shows an example user interface after the user selects a particular feature from FIG. 5A. The user can flag a feature for removal, apply a constraint, such as a monotonic constraint, and request the model to be retrained. The system retrains the model according to the modified specification and presented as a separate version on the user interface. In implementations, the system applying monotonic constraints automatically by first retrieving the appropriate monotonic constraint direction associated with each model input variable and the user-selected modeling task, and then applying each retrieved constraint during the model retaining step. Other modeling constraints and processing steps may be applied similarly, without limitation.

Figure 6:
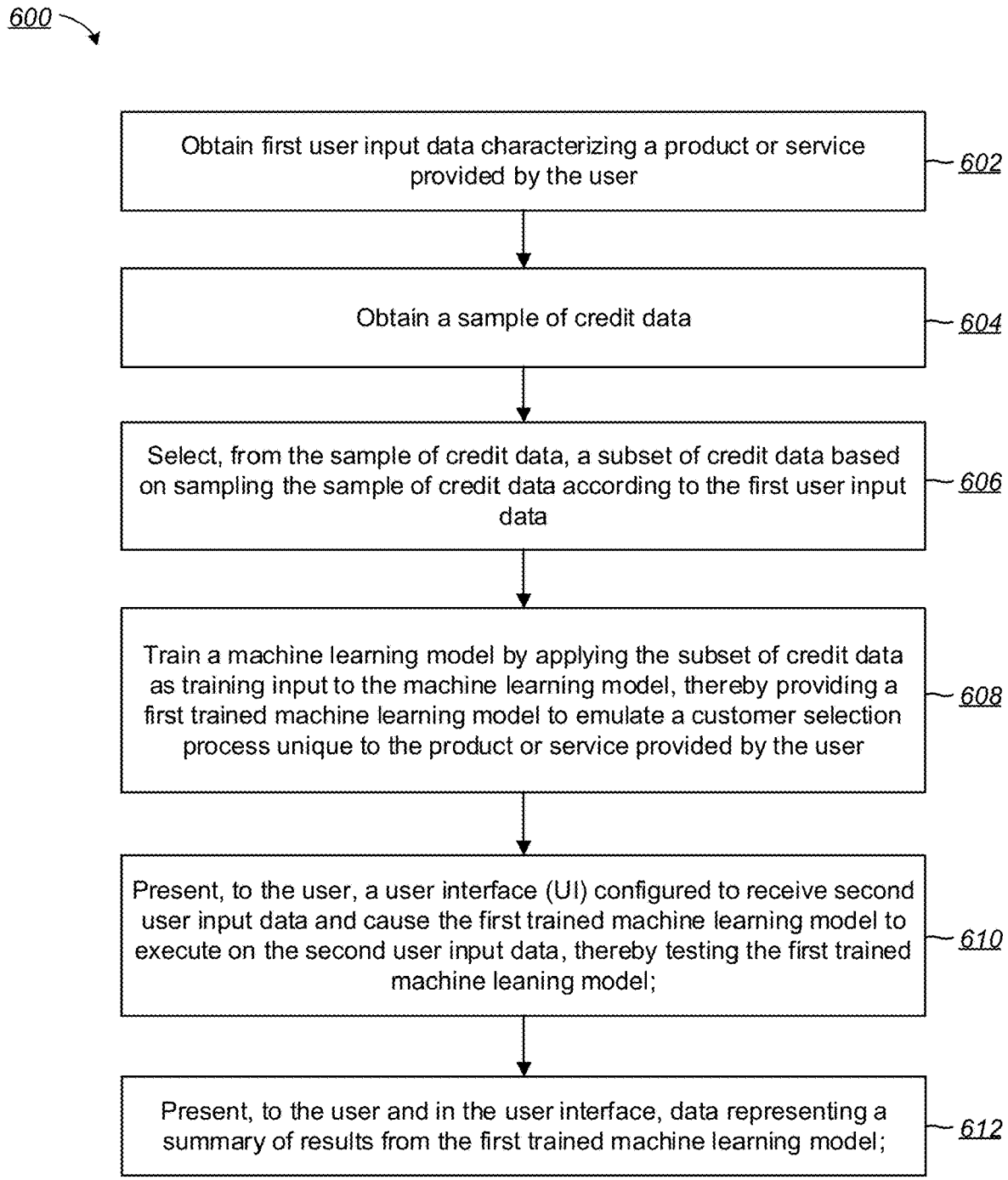
FIG. 6 is a flow diagram of an example process.
Like reference numbers and designations in the various drawings indicate like elements.

FIG. 6 is a flowchart of an example process 600 for generating a machine learning model. The process will be described as being performed by a system of one or more computers programmed appropriately in accordance with this specification. For example, the machine learning engine 142 of FIG. 1 can perform at least a portion of the example process. In some implementations, various steps of the process 600 can be run in parallel, in combination, in loops, or in any order.

The system obtains first user input data characterizing a product or service provided by the user (602). For example, the user is a bank, and the product the user provides is a credit card. As a second example, the user is an insurance company, and the service provided by the user is automobile insurance. The first user input data includes attributes describing the user, including a type and size of business, a region of operation, business classification associated with the user, type of financial product, and alike.

The system obtains a sample of credit data (604). In some implementations, the sample of credit data includes multiple millions of records of credit reports, e.g., those from national credit bureaus. The sample of credit data can be retrieved from a specified time period, e.g., past 48-month. For example, the system obtains the sample of credit data from consecutive quarters from past 48-month period so that the system can determine if applicants who applied for a product (e.g., credit card, personal loan) or service (e.g., insurance) and were approved or paid for the product or service on time. The sample of credit reports is constructed such that there is adequate representation of products, geographies, credit bands (e.g., super-prime, prime, near-prime, etc.) and other demographic attributes in the sample (such as age, gender, race/ethnicity and other protected bases). In implementations, credit data is keyed and linked with other data such as demographic data, or data from other systems such as demand deposit core banking systems, Open Banking APIs, or alternative data vendors.

The system selects, from the sample of credit data, a subset of credit data based on sampling the sample of credit data according to the first user input data (606). The first user input data influences the sampling in multiple manners including the entity-based sampling and the data-based sampling as described above.

The system trains a machine learning model by applying the subset of credit data as training input to the machine learning model, thereby providing a first trained machine learning model to emulate a customer selection process unique to the product or service provided by the user (608). The first trained machine learning model (also referred to as the lookalike model) is a model trained on the sampled credit data, where sampling is applied to ensure that the sampled training data are relevant for a particular application (e.g., predicting whether the credit card applicant will pay balances on time). As described above, the first machine learning model uses any adequate architectures, from convolutional neural networks to gradient boosting. Based on the accuracy of the first machine learning model (e.g., by partitioning the training data and cross-validating on held-out data; by using independent validation data), different architecture can be chosen to retrain the model. In some implementations, the first machine learning model is an ensemble model of sub-models, each sub-model trained using a different architecture.

The system presents, to the user, a user interface (UI) configured to receive second user input data and cause the first trained machine learning model to execute on the second user input data, thereby testing the first trained machine learning model (610). The lookalike model is a model trained on sampled training data, where sampling is applied to ensure the sampled training data are relevant for a particular application. The lookalike model is further refined by combining a second model ("client model") with domain-specific data (e.g., lender-specific historical loan applications). In some implementations, the client model is built based on detailed sampling criteria as described above. In other implementations the client model is built based on the client's credit bureau member ID. In some implementations, the first model and the second model are submodels in an ensemble model. In other implementations, the training rows for both models are combined into a single training dataset and weighted using sample weights to cause the model to consider national data vs customer specific data with a pre-determined weighting. For an example of the credit model, the final model is used to generate a credit risk report for each loan applicant. During application of the first trained machine learning model, the system obtains a second credit data associated with a second user. The second credit data is different from the sample of credit data, and the second credit data is provided as a part of a credit application (e.g., applying for a credit card) associated with the second user. The system applies the first trained machine learning model to the second credit data and obtains, as a first output of the first trained machine learning model, a score indicative of a credit risk (e.g., low risk, high risk) of the second user. In some implementations, the system obtains, as a second output of the first trained machine learning model, one or more reason codes. Each reason code is indicative of a reason for a denial of the credit application. The system provides, based on the score, information indicative of an approval of the credit application associated with the second user. The system provides, based on the one or more reason codes, information indicative of a denial of the credit application associated with the second user, e.g., reasons for the denial.

The system presents to the user and in the user interface, data representing a summary of results from the first trained machine learning model (612). The summary of results includes contribution of each feature used in the first trained machine learning model to the model, estimated approval rate using the first trained machine learning model, and predicted economic impact (e.g., change in the user's revenue). Based on the summary of results, the first trained machine learning model can be retrained, e.g., adjusting features used in the training, depending on the user's preference.

In some implementations, the system obtains, from the user, third user input data comprising actual customer data associated with the product or service provided by the user. The third user input data includes credit reports and/or applications of customers associated with the product or service provided by the user. For example, for the case that the product the user provides is a personal loan, customers' loan applications (including credit history, credit score, income, family size, outstanding debt) can be the third user input data. In some implementations, for the case that the third user input data includes unstructured data, the system processes the third user input data to output the third user input data in a structured format. For example, the system extracts natural language from the third user input data, identifies keywords or topics using unsupervised methods, and generates structured data from inference. In implementations, the system uses latent dirichlet allocation to generate topics from natural language inputs.

In some implementations, relaxation of the sampling criteria is applied. For example, the system identifies a set of constraints to be used to iteratively relax the sampling criteria used to obtain the third user input data. For each iteration of relaxing the sampling criteria, the system determines that the third user input data meet the set of constraints and selects a subset of the credit data based on sampling the sample of the credit data according to the sampling criteria relaxed based on the set of constraints. The set of constraints includes a minimum number of observations.

In some implementations, the system retrains the first trained machine learning model by applying at least the third user input data as training input to the first trained machine leaning model, thereby providing a second trained machine learning model that is a refined version of the first trained machine learning model. Training the machine learning model on the third user input data generates the client model. The lookalike model and the client model can be combined to generate the refined version of the first trained machine learning model, e.g., by ensembling two models by equal weights. The weight of two models can be optimized based on the accuracy of each model on validation and/or test data. Likewise, in some implementations, sample weights are used in a similar way to combine the training data into a single final refined model. During application of the second trained machine learning model, the system obtains a third credit data associated with a third user. The third credit data is different from the sample of credit data, and the third credit data is provided as a part of a credit application (e.g., applying for a credit card) associated with the third user. The system applies the second trained machine learning model to the third credit data and obtains, as a first output of the second trained machine learning model, a score indicative of a credit risk of the third user. The system determines, based on the score, that the credit application is approved. For example, if the score is above a certain predefined threshold, the credit application of the third user is determined to be approved. In some implementations, the system obtains, as a second output of the second trained machine learning model, one or more reason codes. Each reason code is indicative of a reason for a denial of the credit application. For example, the credit application is denied along with a reason code indicating that the third user's average loan balances over the past two years are too high.

In some implementations, metrics and analysis associated with the refined model are presented in the user interface for user approval. The approved model is packaged and deployed as a web service. Subsequent to deployment, the user can access the model via their underwriting process to determine whether to grant a loan to a new loan applicant. For example, the user could configure their loan origination system to access their model via web services API by providing a username and password to the API endpoint or access their model scores via a web-based user interface. In implementations, the model scoring service requests data from credit bureaus and other data sources corresponding to personally identifiable information provided by a user via a user interface. In other implementations, data required to score the model is retrieved by a middleware system, attribute builder, or loan origination system in advance. The data required for scoring the model is sent via API to the scoring service and a score and reason codes are returned to the calling system. In this way, lenders may de-identify the information sent over the internet to the scoring service endpoint prior to retrieving a score.

In some implementations, when the lender receives a new loan application, the loan origination system posts the application data, credit report, and other data required to score the model to the model API endpoint and receives a score and reason codes computed using methods such as those described in applicant's prior patent applications (U.S. Ser. No. 16/434,731 published as US 2019/0378210A1; U.S. Ser. No. 16/688,789 published as US 2020/0265336A1; U.S. 63/046,977). US Pub Nos. US 2019/0378210A1 and US 2020/0265336A1, and Application No. 63/046,977, which are incorporated herein by reference in their entirety. If the score (corresponding to a probability of a deep delinquency) is below a threshold, the user (e.g., lender) can automatically grant the loan and deposit funds or send the borrower a credit card via postal mail. If the score is above a threshold, indicating a high probability of default, the user can deny the loan and use the reason codes to generate a notice of adverse action corresponding to the principal reasons for denial according to the model. The lender may then send the notice of adverse action via postal mail to the applicant as required by the Fair Credit Reporting act of 1970 as amended. The model score and reason codes may also be used by an underwriter in a manual underwriting process to determine whether to grant or deny the loan based on the score and other factors.

In some implementations, fair lending analysis is conducted on the model. Applicant's prior patent applications (U.S. Ser. No. 16/822,908 published as US 2020/0302524A1; U.S. 63/117,696; U.S. 63/248,187) describe the details of fair lending analysis. US Pub No. US 2020/0302524A1 and application Nos. U.S. 63/117,696 and U.S. 63/248,187 are incorporated herein by reference in their entirety. The fair lending analysis is conducted on the refined model by recursively traversing the ensemble tree structure by depth first search and performing the analysis on each submodel and meta-model as the recursion unwinds. For each submodel, a less discriminatory alternative model is selected based on predetermined selection criteria. The selection criteria (selectable by the user through the user interface) include no more discriminatory than the benchmark model, no less accurate than the benchmark model, and no more than 0.05 AUC less accurate than the most accurate model. In some implementations, fair lending analysis includes disparate treatment testing conducted based on the refined model.

In some implementations, a loan applicant's race and ethnicity are computed via a suitable proxy method such as the Bayesian Improved Surname Geocoding (BISG) method. In some implementations, other proxy methods are used including machine learning models built based on publicly available voter registration data.

In some implementations, a less discriminatory alternative search is conducted. The less discriminatory alternative search is conducted on the ensemble by recursively traversing the ensemble tree structure by depth first search and performing the analysis on each submodel and meta-model as the recursion unwinds. Each fair lending analysis result is displayed to the user in the user interface, where the user selects a less discriminatory alternative model based on information presented in the user interface and the fair lending analysis is invoked again after the user selects less discriminatory alternative models or elects to remove a feature. In this way, the system interactively guides the user through selecting a fair lending alternative.

In some implementations, the system includes a monitoring engine that is configured to monitor feature values. For example, the monitoring engine generates an alert when it detects a particular feature (from the training data and the test data) exceeds a threshold value. The threshold value can be determined based on distribution of the feature values. Based on the alert (and the user's approval on the alert), the system can stop the deployed model from implementing on the client devices 102. The monitoring engine and its calibration analysis are automatically documented using the methods described in applicant's prior patent application (U.S. Ser. No. 16/394,651 published as US 2019/0340518A1). US Pub No. US 2019/0340518A1 is incorporated herein by reference in its entirety.

This specification uses the term "configured" in connection with systems and computer program components. For a system of one or more computers to be configured to perform particular operations or actions means that the system has installed software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a standalone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random-access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, the Amazon SageMaker Framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for efficient generation of machine learning models by leveraging data sampling and incremental refinement, the method comprising:

applying a subset of third party credit data as training input to train a first machine learning model that emulates a process unique to a product or service provided by an entity, wherein the subset of the third party credit data is sampled from a credit data sample based on a user input characterizing the product or service;

obtaining, based on sampling criteria and a selection of one or more features represented in the first user input data, second user input data reflective of first party credit data of actual customers of the entity that are associated with the product or service;

applying at least the second user input data as training input to the first trained machine learning model to train a second machine learning model;

combining the first and second trained machine learning models into a third machine learning model via an ensemble function and weights assigned to the first and second trained machine learning models based on an accuracy of the first and second trained machine learning models determined using validation or test data;

deploying the third machine learning model on a server in a computing environment; and executing the third machine learning model to generate credit scores or decisions with respect to the product or service based on input client data received at the server, from a loan origination system, and via one or more communication networks of the computing environment.

2. The method of claim 1, wherein the user input comprises one or more of a type of provided service, region of operation, or business classification.

3. The method of claim 1, further comprising:
applying a first sampling criterion based on a first factor of the first user input data;
determining that the subset of the credit data, after applying the first sampling criterion, exceeds a predefined threshold; and
applying a second sampling criterion based on a second factor of the first user input data.

4. The method of claim 1, further comprising:
identifying a set of constraints to be used to iteratively relax the sampling criteria, wherein the set of constraints comprises a minimum number of observations; and
for each iteration of relaxing the sampling criteria determining that the second user input data meets the set of constraints.

5. The method of claim 1, further comprising:
obtaining second data different from the credit data sample and provided as a part of a credit application;
applying the third machine learning model to the second data; and
obtaining, as a first output of the third machine learning model, a score indicative of a credit risk.

6. The method of claim 5, further comprising obtaining, as a second output of the third machine learning model, one or more reason codes, each reason code indicative of a reason for a denial of the credit application.

7. A system, comprising one or more computers and one or more storage devices storing instructions for efficient generation of machine learning models by leveraging data sampling and incremental refinement that, when executed by the one or more computers, cause the one or more computers to:
applying a subset of third party credit data as training input to train a first machine learning model that emulates a process unique to a product or service provided by an entity, wherein the subset of the third party credit data is sampled from a credit data sample based on a user input characterizing the product or service;

obtain, based on sampling criteria and a selection of one or more features represented in the first user input data, second user input data reflective of first party credit data of actual customers of the entity that are associated with the product or service;

apply the second user input data as training input to the first trained machine learning model to train a second machine learning model;

combine the first and second trained machine learning models into a third machine learning model via an ensemble function and weights assigned to the first and second trained machine learning models based on an accuracy of the first and second trained machine learning models determined using validation or test data;

deploy the third machine learning model on a server in a computing environment; and execute the third machine learning model to generate credit scores or decisions with respect to the product or service based on input client data received at the server, from a loan origination system, and via one or more communication networks of the computing environment.

8. The system of claim 7, wherein the instructions, when executed by the one or more computers, further cause the one or more computers to:
apply a first sampling criterion based on a first factor of the first user input data;
determine that the subset of the credit data, after applying the first sampling criterion, exceeds a predefined threshold; and
apply a second sampling criterion based on a second factor of the first user input data.

9. The system of claim 7, wherein the instructions, when executed by the one or more computers, further cause the one or more computers to:
identify a set of constraints to be used to iteratively relax the sampling criteria, wherein the set of constraints comprises a minimum number of observations; and
for each iteration of relaxing the sampling criteria determine that the second user input data meets the set of constraints.

10. The system of claim 7, wherein the instructions, when executed by the one or more computers, further cause the one or more computers to:
obtain second data different from the credit data sample and provided as a part of a credit application;
apply the third machine learning model to the second data; and
obtain, as a first output of the third machine learning model, a score indicative of a credit risk.

11. The system of claim 10, wherein the instructions, when executed by the one or more computers, further cause the one or more computers to obtain, as a second output of the third machine learning model, one or more reason codes, each reason code indicative of a reason for a denial of the credit application.

12. One or more non-transitory computer storage media storing instructions for efficient generation of machine learning models by leveraging data sampling and incremental refinement that, when executed by one or more processors, cause the one or more processors to:
train applying a subset of third party credit data as training input to train a first machine learning model that emulates a process unique to a product or service provided by an entity, wherein the subset of the third party credit data is sampled from a credit data sample based on a user input characterizing the product or service;

obtain, based on sampling criteria and a selection of one or more of the features represented in the first user input data, second user input data reflective of first party credit data of actual customers of the entity that are associated with the product or service;

apply at least the second user input data as training input to the first machine learning model to train a second machine learning model;

combine the first and second machine learning models into a third machine learning model via an ensemble function and weights assigned to the first and second machine learning models based on an accuracy of the first and second machine learning models determined using validation or test data;

deploy the third machine learning model on a server in a computing environment; and execute the third machine learning model to generate credit scores or decisions with respect to the product or service based on input client data received at the server, from a loan origination system, and via one or more communication networks of the computing environment.

13. The one or more non-transitory computer storage media of claim 12, wherein the instructions, when executed by the one or more processors, further cause the one or more processors to:

identify a set of constraints to be used to iteratively relax the sampling criteria, wherein the set of constraints comprises a minimum number of observations; and for each iteration of relaxing the sampling criteria determine that the second user input data meet the set of constraints.

14. The one or more non-transitory computer storage media of claim 12, wherein the instructions, when executed by the one or more processors, further cause the one or more processors to:

apply a first sampling criterion based on a first factor of the first user input data;

determine that the subset of the credit data, after applying the first sampling criterion, exceeds a predefined threshold; and apply a second sampling criterion based on a second factor of the first user input data.

15. The one or more non-transitory computer storage media of claim 12, wherein the instructions, when executed by the one or more processors, further cause the one or more processors to:

obtain second data different from the credit data sample and provided as a part of a credit application;

apply the third machine learning model to the second data; and obtain, as a first output of the third machine learning model, a score indicative of a credit risk.

16. The one or more non-transitory computer storage media of claim 15, wherein the instructions, when executed by the one or more processors, further cause the one or more processors to obtain, as a second output of the third machine learning model, one or more reason codes, each reason code indicative of a reason for a denial of the credit application.

17. The one or more non-transitory computer storage media of claim 12, wherein the user input comprises one or more of a type of provided service, region of operation, or business classification.

18. The system of claim 7, wherein the user input comprises one or more of a type of provided service, region of operation, or business classification.

* * * * *